United States Patent [19]

Huggins

[11] 4,304,324
[45] Dec. 8, 1981

[54] APPARATUS FOR FEEDING NUCLEAR FUEL PELLETS TO A LOADING TRAY

[75] Inventor: Thomas B. Huggins, Columbia, S.C.

[73] Assignee: Westinghouse Electric Corp., Pittsburgh, Pa.

[21] Appl. No.: 70,959

[22] Filed: Aug. 30, 1979

Related U.S. Application Data

[63] Continuation of Ser. No. 853,367, Nov. 21, 1977, abandoned.

[51] Int. Cl.$^3$ ............................................. B65G 47/26
[52] U.S. Cl. .................................... 198/424; 198/425; 53/247
[58] Field of Search .............................. 198/424–426, 198/429–431, 688, 836; 29/400 N; 53/148, 158, 496, 531, 534, 535, 537, 236, 242, 246, 247

[56] References Cited

U.S. PATENT DOCUMENTS

| | | | |
|---|---|---|---|
| 529,159 | 11/1894 | Bulger | 198/836 |
| 3,127,029 | 3/1964 | Luginbuhl | 198/425 |
| 3,237,365 | 3/1966 | Kovlakoff et al. | 53/247 |
| 3,407,916 | 10/1968 | Engeler | 198/429 |
| 3,897,673 | 8/1975 | Kee et al. | 53/246 |

Primary Examiner—Joseph E. Valenza
Attorney, Agent, or Firm—J. R. Campbell; Z. L. Dermer

[57] ABSTRACT

Apparatus for feeding nuclear fuel pellets at a uniform, predetermined rate between pellet centering and grinding apparatus and a tray used for loading pellets into a nuclear fuel rod. Pellets discharged from the grinder are conveyed by a woven wire belt to a drive wheel which develops a force available to be applied to pellets preceding it on the belt. The pellets pass under the drive wheel which adds additional weight acting vertically on each pellet. This total weight of pellet and drive wheel coupled with wire belt linear movement acts to push a line of about 36 pellets onto a pellet dumping mechanism. As the dumping mechanism is actuated to dump the pellets on to a loading tray, the pellets moving toward the mechanism are clamped in a stationary position and the drive wheel simultaneously is lifted from its pellet contacting position until the pellet dumping process is completed. The clamping device is then lifted from its pellet and the drive wheel simultaneously is lowered into a pellet contacting position.

2 Claims, 4 Drawing Figures

APPARATUS FOR FEEDING NUCLEAR FUEL PELLETS TO A LOADING TRAY

This is a continuation of application Ser. No. 853,367, filed Nov. 21, 1977, now abandoned.

BACKGROUND OF THE INVENTION

The invention described herein relates to a system for handling fuel pellets for a nuclear reactor and more particularly to apparatus used for feeding fuel pellets from a grinding machine to trays used for loading pellets into nuclear fuel rods.

The process practiced in manufacturing a nuclear fuel pellet includes the steps of sintering the pellet in a furnace and thereafter subjecting it to a grinding operation to help assure that its external diameter will be sufficiently small to permit loading into a fuel tube. Upon completion of the grinding operation, the pellets are transferred to a tray which then serves as a source of fuel pellet supply for fuel tube loading purposes.

The system of transfer includes a small vibratory feeder which transfers pellets from the discharge side of the grinder to a surge conveyor which includes a power driven woven metal belt. Since the surge conveyor belt speed is faster than the transfer rate of the vibratory feeder, the pellets discharged from the feeder are automatically spaced from each other on the belt and along the belt length. It is obvious that in this known design, a pellet on the belt has the same horizontal speed as the belt surface. If the horizontal motion of the pellet is stopped by a resisting force against the end of the pellet, such as a large number of abutting pellets, the pellet will slide on the belt, i.e., pellet horizontal movement stops but the belt continues to move under it. The force against the pellet that would cause it to stop must be equal to or greater than the force developed by the pellet weight times the coefficient of friction between the woven belt and pellet surfaces. Therefore, a pellet being transported on the belt will develop a horizontal force approximately equal to its weight times the coefficient of friction between the two surfaces. A resultant force developed by a series of sliding pellets is capable of pushing an equivalent number of pellets axially over a stationary plate, and this principle has been relied on in the past to move pellets to a position on the plate which sequentially dumps rows of pellets into grooves in a tray. During the time required for the compete pellet dumping and tray removal and replacement operation to take place, the pellets on the surge belt must be stopped to prevent run-over onto the dumping plate. Since the pellets pass between two parallel motor driven belts, when the last pellet, i.e. in this case the 36th pellet, moves onto the dumping plate, a clamp becomes effective to clamp the 37th pellet and pellets behind it merely stack up behind it in a horizontal straight line. Simultaneously, the motor driving the belts is stopped thus preventing pellet movement toward the dumping section of the apparatus. The clamp releases and the motor starts after the pellets are dropped into grooves in a tray.

The primary disadvantage of this design is that the line of pellets required to fill the discharge chute with pellets leaves no space for surge capacity during the time required for the tray loader to advance a new tray into loading position.

SUMMARY OF THE INVENTION

Briefly stated, the above disadvantages of the prior art are overcome in accordance with the teachings of this invention by providing apparatus which provides for the application of a weight, in addition of that of a fuel pellet, to advance fuel pellets to a position where they conveniently can be discharged into grooves in a tray. During pellet discharge onto the tray, the movement of pellets through the apparatus is temporarily halted by removing the weight added to each pellet and in restraining pellet linear movment.

BRIEF DESCRIPTION OF THE DRAWINGS

The subject matter of the invention is particularly pointed out and distinctly claimed in the concluding portion of this specification. The organization and method of operation of the invention together with further objects and advantages thereof may best be understood by reference to the following description taken in connection with the accompanying drawing in which:

DESCRIPTION OF THE PREFERRED EMBODIMENT

Figure 1:
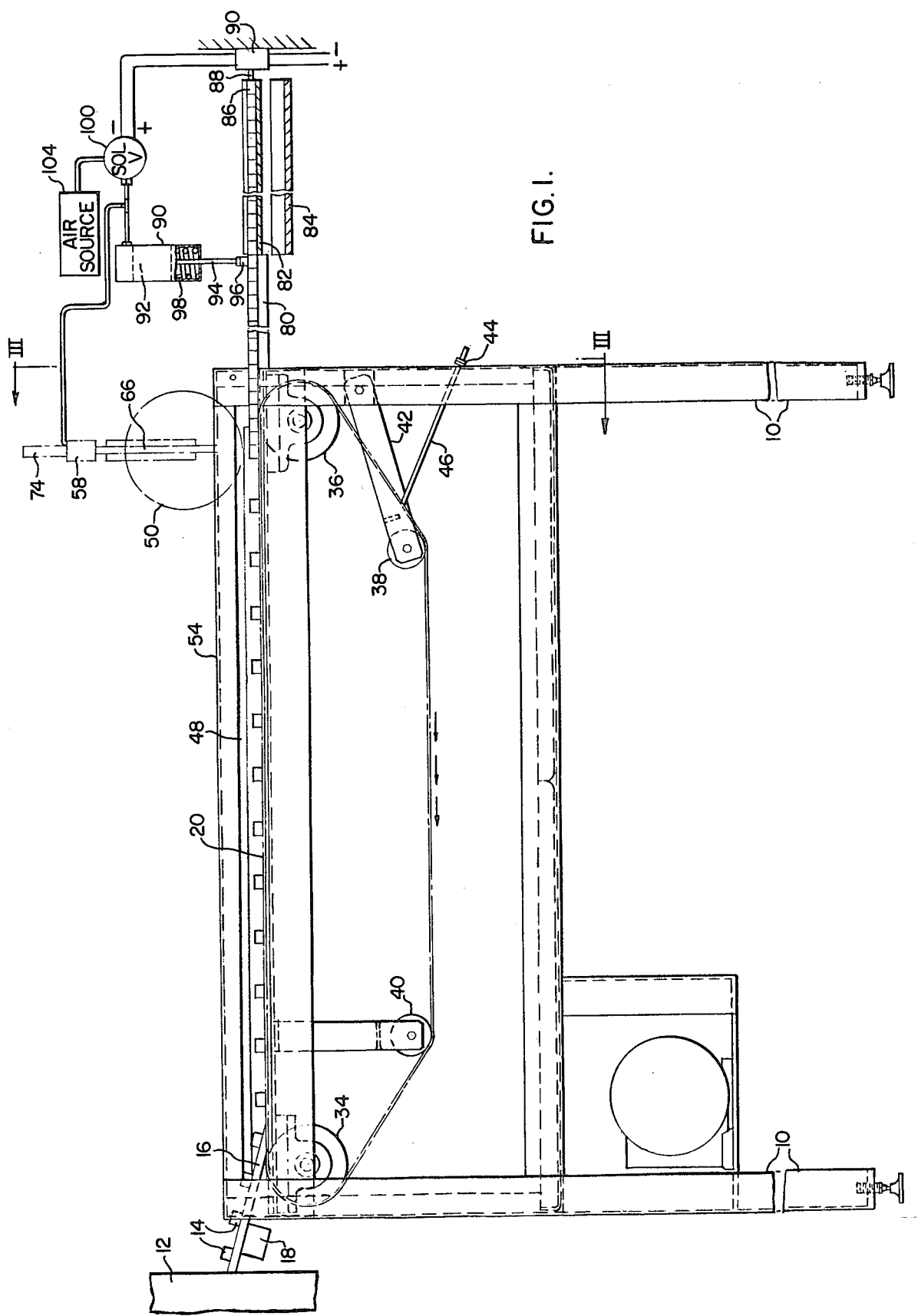
FIG. 1 is a front view and elevation of a pellet surge conveyor used for transferring pellets between a grinding machine and a loading tray.
Figure 2:
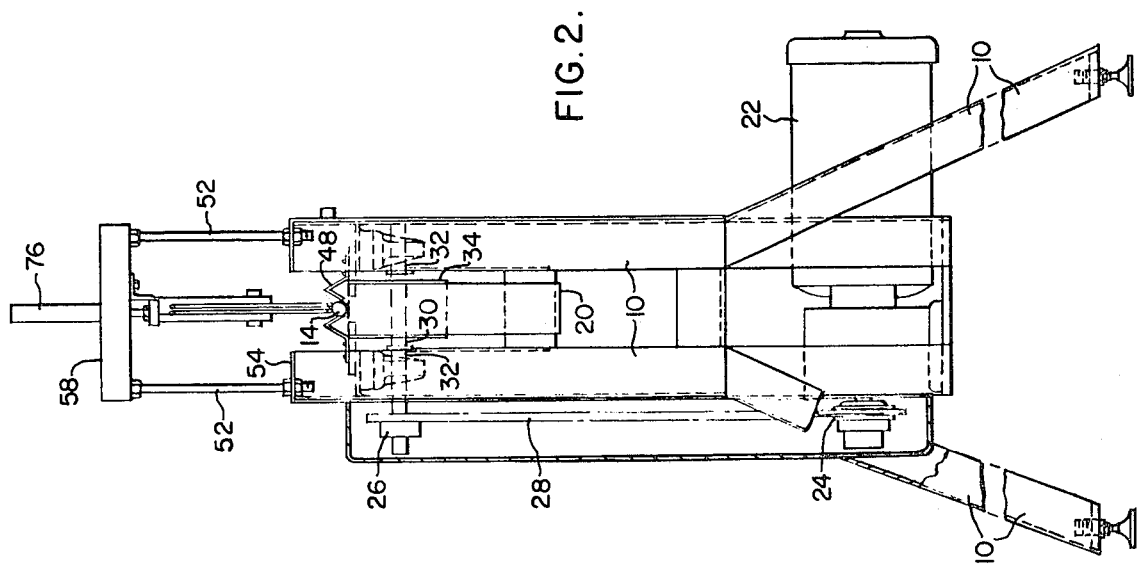
FIG. 2 is a left side view of the surge conveyor of FIG. 1.
Figure 4:
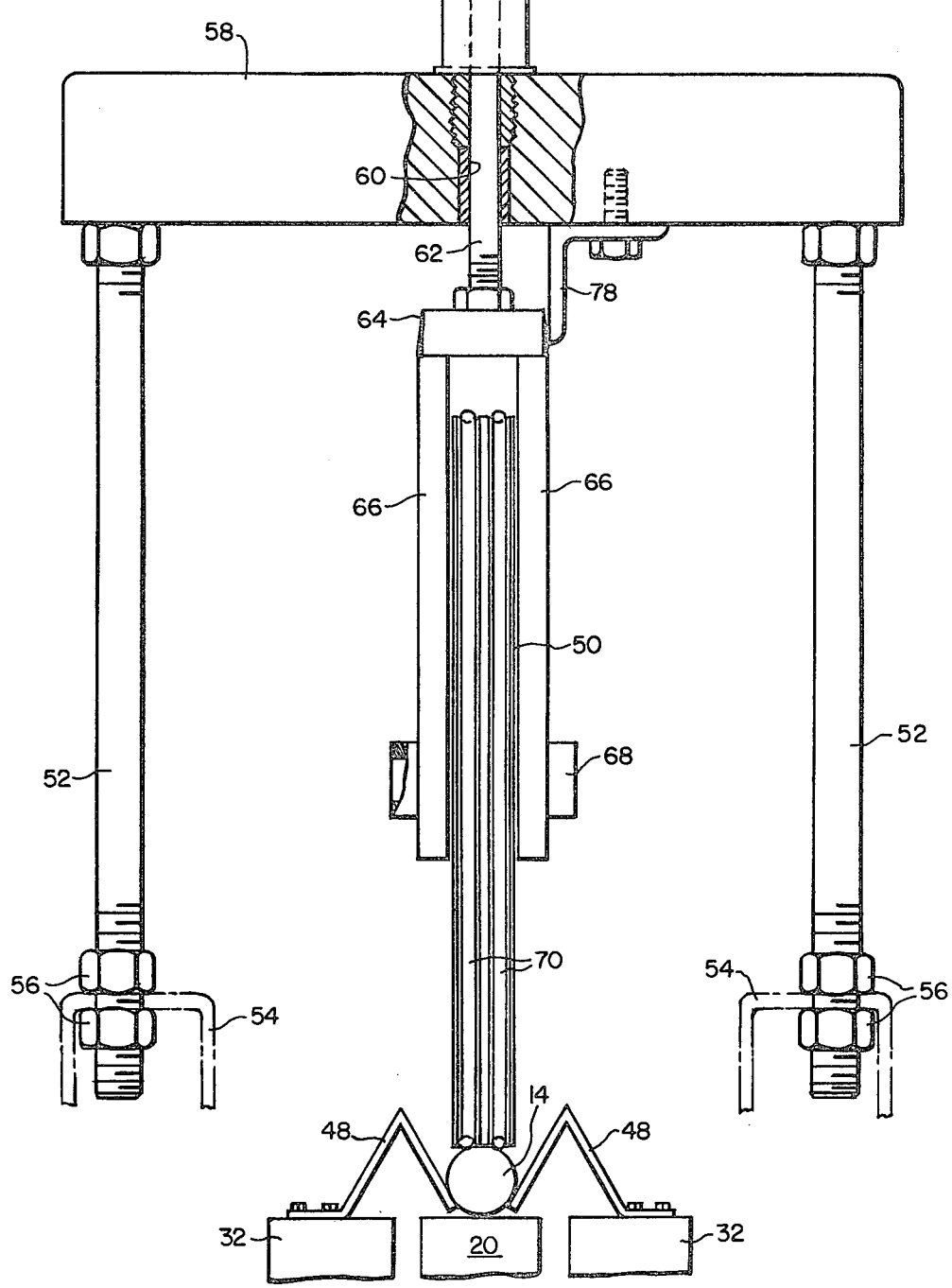
FIG. 4 is an enlarged view of the drive wheel used for moving pellets through the apparatus.

Referring now to the drawings wherein like reference characters designate like or corresponding parts throughout the several views, there is generally shown in FIG. 1, a pellet surge conveyor including a base having legs 10 supporting apparatus used for advancing fuel pellets linearly along its length. A first pellet grinder 12 which receives nuclear fuel pellets 14 from a sintering furnace, not shown, grinds the pellets to a predetermined maximum diameter in accordance with well-known practices. The pellets are discharged from the grinding machine onto a vibrating feed through 16 such that pellets are freely moved therealong by a vibrator 18 onto an endless woven wire belt 20. As shown in FIGS. 1 and 2, the wire belt is driven by a conventional drive motor 22 having lower and upper sprockets 24, 26 and a chain 28 therebetween transmits torque to shaft 30 which is supported in bearings 32. A roller 34 is keyed to shaft 30 and accordingly rotates therewith.

As more clearly shown in FIG. 1, the belt is supported by the roller 34, pulley 36, adjustable roller 38 and idler gear 40. Roller 38 is mounted on bracket 42 pivotally mounted on frame legs 10 and belt tension is adjusted by nuts 44 on member 46.

Since it is important to keep pellets oriented in the same direction as the belt axis and lying horizontally in a straight line on the belt, a pair of inverted angle arms 48 are mounted on the bearing blocks and are spaced a distance sufficient to permit the lower surface of each pellet to contact the wire belt surfaces while being guided by the angle irons 48. Each pellet weighs about 7 to 10 grams so that its position on the belt does not move after it assumes its initial position.

As indicated previously, a pellet on a moving wire belt will develop a horizontal force against any object it contacts, such as another pellet, and attempt to move it within the limits of such force. When the object resistance to movement exceeds the horizontal force, the pellet will slide on the belt because the resulting force of the weight of the pellet multiplied by the coefficient of friction between the pellet and woven wire belt surfaces will be less than the force presented by resisting body. Because of the mechanical inefficiency of transfer of forces, one pellet therefore cannot develop sufficient force to move the next preceding pellet. In this system, if one pellet weighs approximately 10 grams, the coefficient of friction at the pellet-wire belt interface is such that a 10 gram pellet will develop a horizontal force of approximately 8 grams. Since this does not represent a reasonable method of pushing pellets toward a tray, a force which acts in addition to the pellet weight, is used to create an artificially increased weight. In this invention such artificial weight takes the form of a spring loaded wheel arranged such that the pellets "roll" under the wheel, thus developing the extra weight and a resulting force which will drive pellets on to a dump mechanism associated with a tray loader.

Figure 3:
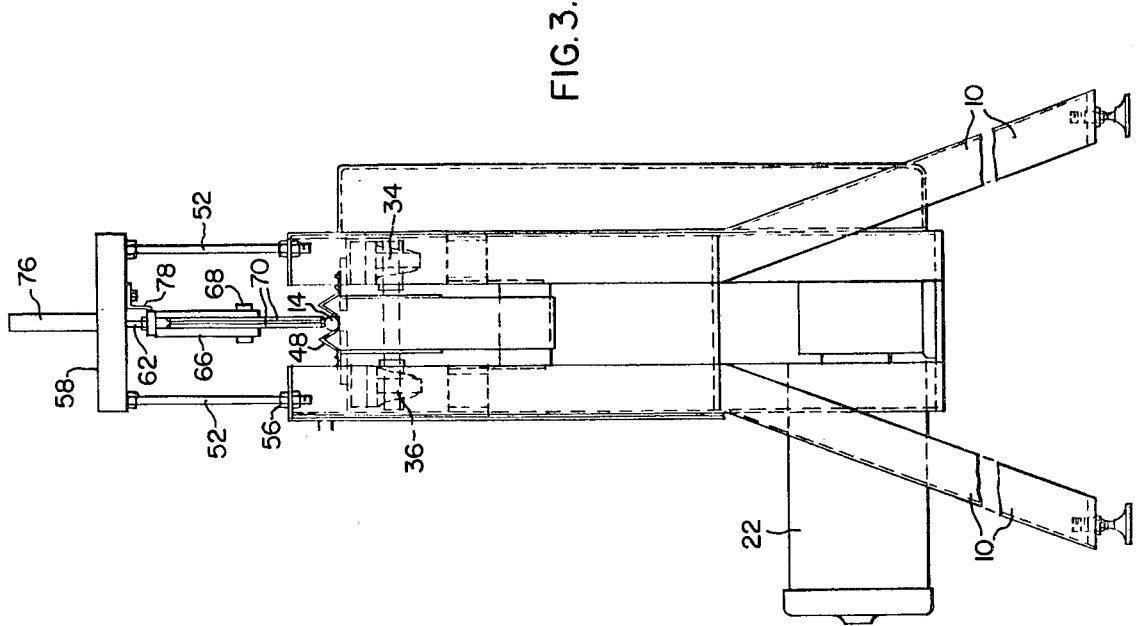
FIG. 3 is a view taken on lines 3—3 of FIG. 1.

As shown in FIG. 3, the wheel type structure comprises a pair of threaded rods 52 attached at their lower ends to housing 54 by nuts 56. The upper ends of the rods are similarly fixed to a mounting head 58 having a central opening designed to contain bearing 60. A shaft 62 arranged for sliding movement in the bearing is adjustably attached at its lower end to block 64. The block has a pair of spaced depending arm 66 which support pellet feed wheel 50 by means of needle bearings and a dowel pin 68. In order to appropriately engage and move a pellet from belt 20 to a loading tray, the outer peripheral surface of the drive wheel has a pair of spaced grooves which receive O rings 70. These rings are relatively soft and pliable and readily conform to a pellet surface as it passes beneath the wheel. Since there must be flexibility in the system, at least to accommodate vertical displacement of the wheel as it engages each pellet, shaft 62 is connected to a piston 72 vertically movable in cylinder 74 surmounting the wheel. The piston is loaded in a pellet engaging direction by spring 76 and it therefore always biases wheel 50 into contact with a pellet. To help preclude lateral displacement of wheel 50, an angle iron 78 or other guide member is attached to frame 58 and positioned to be contacted by block 64 during the time of vertical reciporcation of wheel 50.

As indicated previously, the weight of the drive wheel plus that of each pellet is sufficient to provide a horizontally directed force capable of moving the pellets to a loader where they are dumped onto a tray which subsequently is used as a source of fuel pellet supply during the time of loading a fuel tube with pellets. In the preferred embodiment of this invention, the total weight of the feed wheel and its support structure, including the weight of shafts 62 and piston 72 plus the downwardly acting force of the spring plus the 10 grams for each pellet results in a total downwardly acting force of 918 grams. This weight provides a total horizontally acting force of 734.4 grams which is used for pushing the pellets along a V section appearing on the discharge side of the feed wheel. These weights are specifically chosen to permit the feed wheel to push 36 pellets into the V section since that number of pellets can be accommodated by the specific tray used for fuel tube treating purposes.

As pellets are discharged from beneath the wheel, they leave the V-shaped inverted angle arms 48 and move into a second V-shaped trough 80 of similar design. Since the last pellet leaving the wheel pushes against the pellets immediately preceding it, they assume a horizontal end to end relationship with the pellet ends abutting one another. This row of pellets is then pushed on to a pivotally mounted loader 82. The loader is designed and of a size to accept 36 pellets, this total length representing the length of a pellet groove in a tray 84 located immediately therebeneath. When the lead pellet 86 closes microswitch 88 of relay 90, an appropriate control mechanism, not shown, dumps the pellets from loader 82 into a groove in tray 84. The specific mechanical-electrical arrangement used for actuating the loader 82 and moving the tray 84 are well known in the art and do not constitute a part of this invention. As each groove is filled, the tray is indexed to the next groove position to permit the dumping of fuel pellets thereinto until the tray is full. It then is removed by appropriate means and delivered to an area when the fuel pellets are loaded into fuel rods.

Since it is important to stop linear movement of pellets from trough 80 into the loader 82 during the time dumping of 36 pellets is taking place, a pellet stop member in the form of clamping device 90 is used for this purpose. The device includes a cylinder housing a piston 92 connected to a connecting rod 94 having a solid section 96 mounted on the bottom end thereof. The member 96 acts to clamp a pellet in position in trough 80 when the piston is moved downwardly against the upward biasing action of spring 98. When this occurs, movement of pellets from trough 80 on to the loader is positively precluded.

It will be apparent that the wheel 50 cannot continue to move pellets toward loader 82 when pellets are being discharged on to the tray. To accommodate this situation, when lead pellet 86 closes microswitch 88, relay 90 acts to open solenoid operated valve 100. This valve simultaneously connects air source 104 to the bottom of wheel cylinder 76 and top of clamp cylinder 91. Air pressure then causes wheel piston 72 to move upwardly against the action of spring 74, and clamp piston 92 to move downwardly against the action of spring 98. These actions move the wheel out of the pellet contacting area thus removing the horizontal driving force. The pellets on trough 80 are already in a continuous line, end to end, and since clamp member 96 is in engagement with the first pellet in a line, it holds it against movement and pellets normally stack up behind it on the surge conveyor. After pellet dumping is completed, microswitch 88 opens thus deenergizing the solenoid valve 100, which vents air from cylinders 76, 90 and wheel 50 moves downwardly to engage pellets while clamp member moves upwardly out of its pellet contacting position.

OPERATION

This invention is based on the premise that a pellet traveling on a level woven wire belt will develop a horizontal force and that it will slide on the belt surface when opposed by a greater resisting force. This horizontal force is the product of the weight of the pellet and the coefficient of friction between the pellet and the belt surfaces. Since the force generated by a multitude of pellets is not reasonably efficient and effective in moving pellets from a trough onto a loader, a wheel has been added to the system to provide an artificial force effetive in moving the pellets over the desired distance and direction.

As pellets are delivered from a pellet grinding machine to the surface of the wire belt 20, they are conveyed to the feed wheel 50 and roll under the wheel which develops the extra weight, thus providing a resulting force to drive the pellets into the dump mechanism on the tray loader. The dump mechanism is designed to accept 36 pellets and as the lead pellet engages microswitch 88 at the end of the mechanism, the solenoid valve 100 in an air line are actuated to an open position, and air is fed simultaneously to the bottom of the feed wheel cylinder and the top of the clamp cylinder. The air acting under the piston in the feed wheel causes the piston and attached wheel to move vertically out of contact with the pellet thus relieving the force which normally is used for pushing the pellets toward the dump mechanism. Likewise, as air is applied to the top of the clamp cylinder, piston 92 therein and its connected clamp member is moved downwardly to engage a pellet which in this case is the 37th pellet in the line. This clamp mechanism merely precludes movement of the pellets onto the dump mechanism and they accordingly stack up in end to end abutting relationship. After the dump mechanism discharges the pellets into a groove in the tray, and returns to its initial position for accepting pellets, the microswitch again opens the circuit to the solenoid and the air valves move to the second position to vent air from the feed wheel cylinder and the clamp cylinder. This action permits the spring in the feed wheel cylinder to move the feed roll downwardly into engagement with the pellets on the wire belt. Likewise, the spring in clamp cylinder raises the piston and its connected clamp member upwardly. Since the wire belt is in motion the pellets accordingly will be moved by the wire belt and the feed wheel on to the dump mechanism for repetition of the cycle.

It will be apparent that many modifications and variations are possible in light of the above teachings. It therefore is to be understood that within the scope of the appended claims, the invention may be practiced other than as specifically described.

I claim:

1. Apparatus for transferring nuclear fuel pellets from a grinding machine to a tray loader comprising:

a frame supporting a member which bridges spaced legs in the frame;

an endless belt on said frame which rides on said member;

a generally V-shaped trough mounted immediately above said belt and extending axially thereof for accepting pellets from said grinding machine and thereafter guiding said pellets as the belt moves them linearly along said frame;

a dump mechanism having pellet receiving grooves aligned with the V-shaped trough for receiving pellets from the latter during operation, adjustable force producing means mounted above said belt, said force producing means including a feed wheel having spaced members on its peripheral surface arranged to contact each pellet when the wheel is selectively moved into a pellet engaging position, said feed wheel acting to produce an artificial weight which when multiplied by the coefficient of friction between the pellet and belt surfaces, will produce a force capable of moving the immediately ahead pellets linearly from the belt on to a stationary plate and from there, on to grooves in the dump mechanism;

clamping means mounted above said stationary plate and at a point adjacent said dump mechanism, said clamping means including a member having a solid surface arranged to contact a pellet to preclude further pellet movement onto said dump mechanism; and control means on said receiving means engageable by said pellets, said control means including a switch arranged to be contacted and closed by pellets on said dump mechanism when a predetermined number of pellets reside in at least one groove thereon, said switch being in circuit with a selectively operable valve which controls the supply of energy from a source separately to the clamping means which contacts the first pellet on said plate, and thereby prevents further pellet movement on to the dump mechanism, and to the force producing means to lift the same when a predetermined number of pellets appear on said dump mechanism and thereby permit the dump mechanism to dump the pellets on to said loading tray.

2. Apparatus according to claim 1 wherein said clamping means includes a cylinder having a piston therein, a shaft interconnecting said piston with a clamping member having said solid surface thereon which engages a pellet;

a spring in said cylinder arranged to urge said piston in an upward direction to thereby move said clamping member out of contact with a pellet during the time pellets are being moved on to the dump mechanism; and means connecting said cylinder with said valve so that as the switch acts to open said valve, energy from the source moves said clamping member into contact with a pellet.

* * * * *